March 14, 1933.  T. J. HUDSON  1,900,934
CHUCK
Filed March 27, 1930  2 Sheets-Sheet 2
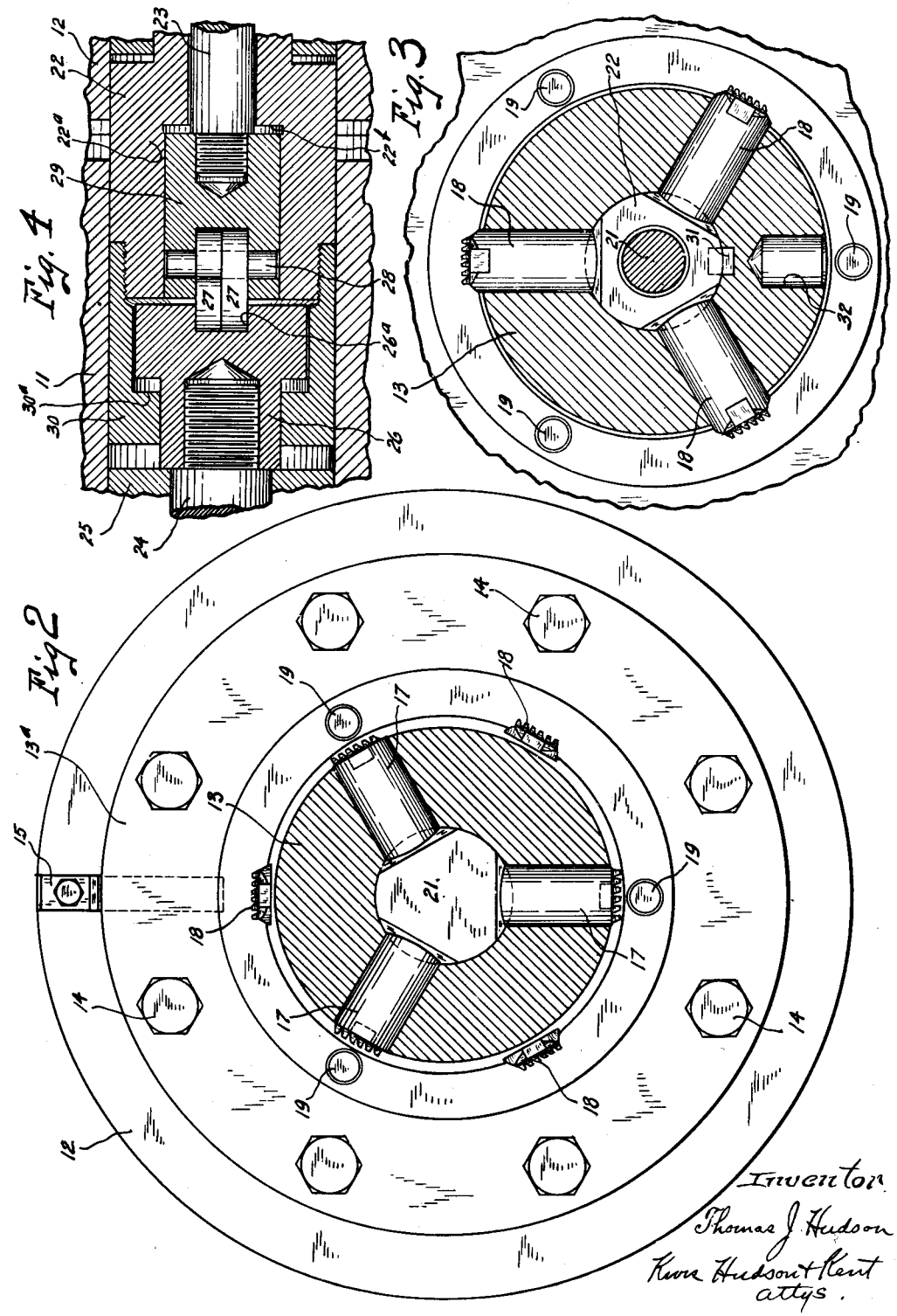

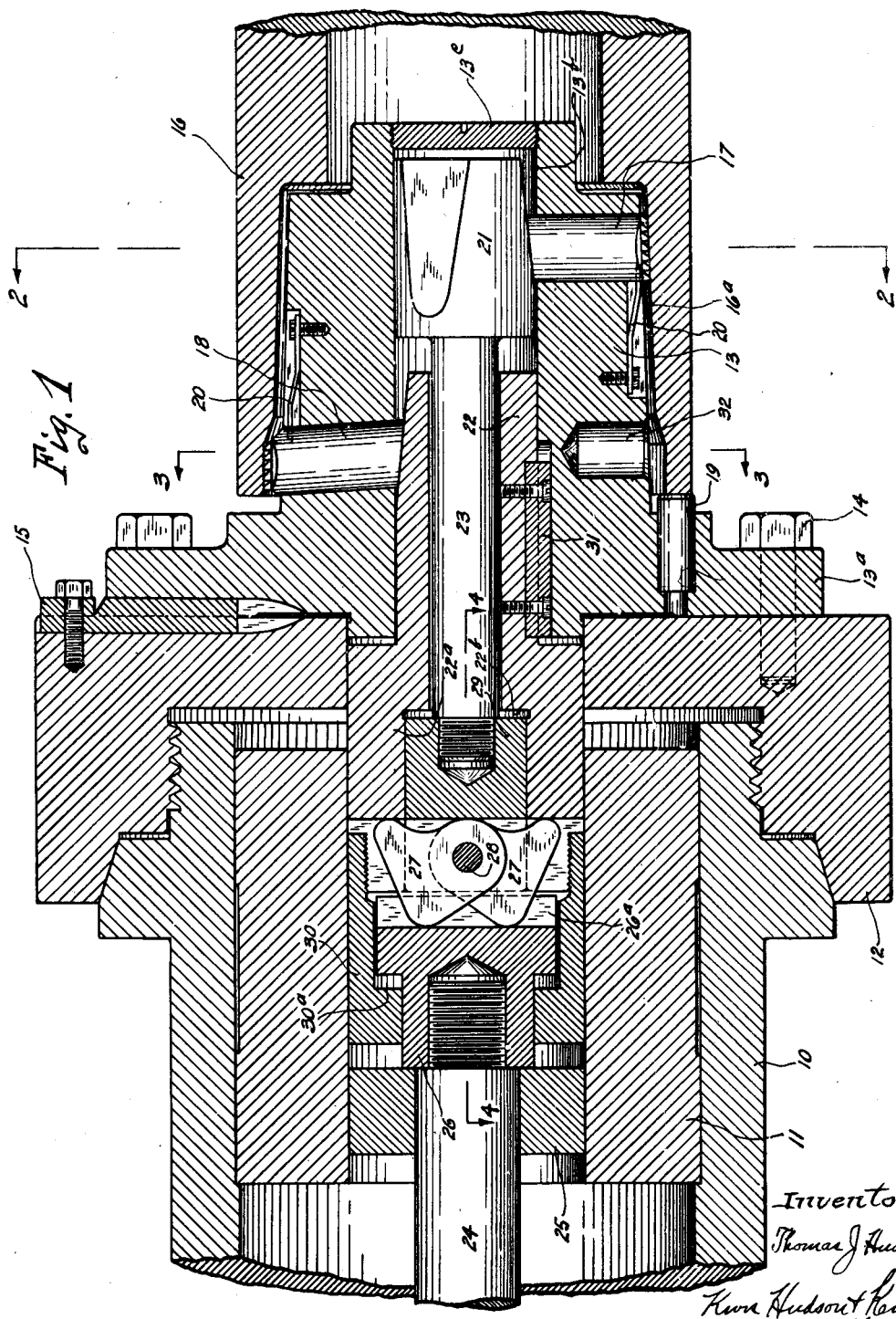

Patented Mar. 14, 1933

1,900,934

UNITED STATES PATENT OFFICE

THOMAS J. HUDSON, OF CLEVELAND, OHIO, ASSIGNOR TO THE WARNER & SWASEY COMPANY, OF CLEVELAND, OHIO, A CORPORATION OF OHIO

CHUCK

Application filed March 27, 1930. Serial No. 439,480.

This invention relates to chucks for use on machine tools and has for its chief object to provide a chuck which is adapted to grip a work piece solidly and to center it with respect to previously machined portions so as to obtain a very high degree of accuracy, particularly in regard to its centralization with respect to the machined part or parts.

A further object is to provide a chuck which is adapted to grip the work piece internally on previously machined surfaces which are of such a nature in their form or configuration that difficulties would be normally presented in gripping and centralizing the work piece.

Still further the invention aims to accomplish the above objects with a novel and effective form of equalizer for obtaining uniform gripping action between the two sets of jaws, with provision for positively retracting the jaw moving members when the power operated actuator which acts on the equalizer is retracted.

A still further object is to provide a construction which admits of quick removal and replacement of the gripping mechanism with another suitable for other types and sizes of work pieces.

The invention may be further briefly summarized as consisting in certain novel combinations and arrangements of parts which will be described in the specification and set forth in the appended claims.

In the accompanying sheets of drawings showing an embodiment of the invention which operates very effectively, Fig. 1 is a longitudinal sectional view of a chuck embodying the invention and applied to a standard work spindle of a lathe, a portion only of the spindle being shown; Fig. 2 is a transverse sectional view substantially along the line 2—2 of Fig. 1; Fig. 3 is a similar view substantially along the line 3—3 of Fig. 1; and Fig. 4 is a fragmentary longitudinal sectional view substantially along the line 4—4 of Fig. 1.

Referring now to the drawings, 10 represents the nose of a standard work spindle of a lathe in which spindle is tightly fitted a bushing 11. Screwed onto the spindle nose and engaging a tapered portion thereof for tightness and accuracy of fit is a so-called adapter 12 and to the face of this adapter is secured the chuck body 13 having at the rear a flange-like portion 13ª which engages the front face of the adapter 12 and is secured to the adapter by screws 14 and by a key 15 engaging registering grooves in the adapter and flange of the chuck body, this key being designed to transmit the drive or torque between the adapter and chuck body and relieve the screws of this function. A central rear portion of the chuck body fits closely within the bore of the adapter for centering purposes and is illustrated in Fig. 1.

The work piece, which is illustrated at 16, is in this instance a tool joint for well drilling apparatus, which article is required to be machined with the maximum degree of accuracy and which heretofore it has been difficult to support in a chuck in centralized relation with a previously machined surface which is formed on the interior of the work piece at 16ª. To support this work piece so as to attain the objects stated at the beginning of this specification, I employ two sets of jaws, one forwardly of the other, and those of one set in staggered relation with respect to the others. The jaws of the forward set are indicated at 17 and the jaws of the rear set are indicated at 18, the jaws of both sets being designed to engage portions of the machined surface 16ª. The jaws of the rear set in this instance project outwardly beyond the jaws of the front set and, additionally, they are inclined rearwardly so that when they engage the rear part of the interior surface 16ª they will have a tendency to move the work piece rearwardly and to hold it solidly against stop pins 19 which are fitted into the rear flanged portion of the chuck body so as to be engaged by the rear end of the work piece, as indicated in the lower part of Fig. 1, three of these stop pins being preferably provided, as shown in Figs. 2 and 3. The chuck body is provided with suitable means, such as springs 20, which engage notched portions of the jaws of both sets to urge the jaws inward and to keep them from falling out of the chuck body.

For the purpose of moving the jaws of both sets outwardly into gripping engagement with the work piece, I employ two separate jaw camming members 21 and 22. Both of these members are cylindrical in form but are provided with so-called flats or tapered surfaces which are engaged by the inner ends of the jaws which are at all times held in engagement with these flats by the springs 20. These two cam members have a sliding engagement with the cylindrical wall or bore 13$^b$ extending through the chuck body 13, the cam member 21 being forwardly of the member 22 but having a stem 23 extending through an opening formed endwise through the cam member 22. The forward end of this bore is closed by a screw plug 13$^c$ to keep chips and dirt from the bore. The rear portion of the cam member 22 has a cylindrical enlargement 22$^a$ which engages the inner surface of the adapter 12 and of the bushing 11.

For the purpose of actuating the jaws, I utilize an actuator 24 which extends through the work spindle 10 and may be operated in any suitable way, either manually or automatically. The forward portion of this actuator slides in a centralizing bushing 25 which is fitted into the bore of the bushing 11. The actuator 24 has a reduced threaded forward end which is screwed into the threaded socket of a head 26, forming in effect a part of the actuator. Power is transmitted from the head 26 to the cam members 21 and 22 by two equalizing transmitters 27 which are loosely or freely mounted on a pin 28 carried by the rear end of a head 29 screwed onto the reduced threaded rear end of the stem 23, forming a part of the cam member 21 (see Figs. 1 and 4). This head 29 carrying the equalizing transmitters 27 is fitted into a socket of the enlarged rear end of the cam member 22 and has sliding engagement therein. Just forwardly of the head the cam member 22 has a shoulder 22$^b$ the purpose of which will be explained. To accommodate the equalizing transmitters 27, the later lie in a slot formed partly in the rear end of the head 29 and partly in the rear end of the enlarged portion 22$^a$ of the cam member 22. The portion 22$^a$ of the cam member 22 has an extension in the form of a sleeve-like member 30 which is secured onto the enlargement 22$^a$, as shown in Figs. 1 and 4, and has at its rear end an inwardly extending flange forming a shoulder 30$^a$ which lies between the forward portion of the head 26 and the bushing 25.

The equalizing transmitters 27 are in this instance in the form of levers, the outer ends of which extend into the slots formed in the enlargements 22$^a$ and bear against the latter, as clearly illustrated in Fig. 1. Likewise these levers are somewhat in the form of bellcranks, having rearward extensions which lie in a slot 26$^a$ formed in the forward portion of the head 26 carried by the actuator 24. The pressure of the head 26 on each of the equalizing transmitters 27 lies substantially midway between the pin 28 on which the transmitters are mounted and their outer ends where they bear upon the enlarged rear portion 22$^a$ of the cam member 22, but preferably slightly beyond the middle points of the transmitters toward their free ends. The power which is transmitted from the actuator 24 to the head 29 which is screwed on the stem 23, may be delivered to the pin 28 and from the pin to the head, or, to avoid any likelihood of the pin being sheared, the inner hub-like portions of the equalizing transmitters through which the pin 28 extends may bear against the rear central part of the head 29, as illustrated in Fig. 1, in which event the power is transmitted by the head 26 of the actuator direct from the equalizing transmitters to the head 29 more or less independently of the pin.

By reason of the fact that the equalizing transmitters lie in slots formed in the head 26, in the head 29, and in the enlarged rear portion of the cam member 22, (see Fig. 4) they serve as keys to lock these parts together against relative rotation. This relationship prevents the stem 23 and therefore the cam member 21 from turning with reference to the cam member 22, and since the cam member 22 is prevented from turning with reference to the chuck body 13 by reason of a key 31, both cam members are held against turning with reference to the two sets of jaws they actuate.

In operation, the work piece may be slipped over the forwardly projecting part of the chuck body and, of course, over the two sets of jaws, manually or by a suitable loading device. As soon as the work piece is positioned up against the stops 19, the actuator 24 is moved forwardly. This causes the head 26 to transmit power to the equalizing transmitters 27 and these in turn press the two cam members 21 and 22 forwardly, moving the jaws outwardly into engagement with the work. Generally the transmitters 27 are so shaped that there is slightly greater leverage exerted through them on the outer cam member 22 during the initial part of the jaw actuating movement so as to move the rear set of jaws 18 outwardly so as to engage the work prior to the engagement of the jaws 17 with the work piece. This insures a solid and square engagement of the work piece with the stops 19 as well as the centralization of the work with respect to the axis of the work piece. However, I do not regard it important that the rear set of jaws engage the work piece ahead of the forward set of jaws. In any event, regardless of which pair of jaws first engages the work piece, the rocking of the equalizing transmitters will in the final closing operation cause both sets of jaws to engage the work piece with equal pressure, that being the desirable and, in fact, the essential consideration. If one set of jaws engages the work piece ahead of the other set, when the first set is in solid engagement with the work piece further movement of the actuator 24 will cause the equalizing transmitters to rock, i. e., change their positions with respect to the two cam members, thus causing the cam member corresponding to the set which has not engaged the work piece to move outwardly relative to the other cam member until both sets of jaws engage the work piece with equal pressure.

After the work piece has been machined, the actuator 24 is moved rearwardly or in the reverse direction, and as soon as the shoulder formed by the forward portion of the head 26 engages the shoulder formed by the flange 30$^a$, both actuators are moved rearwardly and the jaws are retracted by the springs 20. If during this rearward movement of the cam members the inner cam member should, because of friction, tend to remain in its forward position, a shoulder 22$^b$, just forwardly of the head 29 will engage the head so as to cause the cam member 21, as well as the cam member 22, to be positively retracted, with the coincident retracttion of the jaws away from the work piece.

If it should be desired that the chuck body accommodate work pieces of a different size or shape than a given work piece such as illustrated, making it advisable to substitute a different chuck body and associated parts, the screws 14 and the key 15 are moved and the chuck body is then rotated, preferably by inserting a bar in a socket 32 provided in the chuck body for this purpose. Because of the keyed relationship between the cam member 22 and the chuck body and the keyed relationship between the cam member 22, the head 29 and the head 26 produced by the action of the equalizing transmitters in the slots of these three members, turning of the chuck body after the screws 14 and the key 15 have been removed will turn also the two cam members, the head 29, the sleeve-like member 30 and the head 26, unscrewing the latter from the reduced threaded forward end of the actuator 24. This entire unit can then be slipped out and replaced with another unit which will accommodate work pieces of a different size or shape.

While I have shown only one construction, that being the preferred one, changes may be made in details of construction and arrangement without affecting the principle of the invention, and I aim in my claims to cover all modifications which do not involve a departure from the spirit and scope of my invention.

Having thus described my invention, I claim:

1. In a chuck, a chuck body having two sets of jaws, a pair of cam members for actuating them, one of said cam members being keyed to said body, an actuator, the adjacent portions of the actuator and cam members being slotted, and equalizing transmitting means in the slotted portions whereby said cam members and actuator will rotate as a unit when said chuck body is rotated.

2. In a chuck, a rotatable body, a pair of jaws one in advance of the other, a pair of cam members for actuating the jaws, one having a portion extending through the other, the latter having a chamber formed at its rear end, an actuator for actuating the cam members and having a portion movable in said chamber and adapted when moved in one direction to engage an end wall of said chamber to move said cam member, and equalizing means in said chamber between the forward end of the actuator and portions of the two cam members.

3. In a machine tool, a rotary spindle, an adapter secured to the spindle, and a chuck unit removably attached to the adapter and including a chuck body, two sets of jaws, a pair of independently movable cam members for actuating the jaws, an actuator and equalizing means for transmitting movement of the actuator to the cam members, said chuck body, cam members and actuator being keyed to one another.

4. A chuck including a chuck body, two pairs of jaws, a cam member keyed to the chuck body for actuating one set of jaws, a second cam member for actuating the other set of jaws, equalizing members adapted to shift the cam members, and an actuating member for engaging and shifting the equalizing members, said cam members, equalizing members and actuating member all being keyed to one another to rotate as a unit with said chuck body.

5. In a chuck, a chuck body having two sets of jaws, two independently movable cam members for actuating the jaws, an actuator for shifting the cam members, and equalizing means between the actuator and the cam members, the actuator and one of the cam members having cooperating shoulders, whereby when the actuator is retracted said last mentioned cam member is retracted.

6. In a chuck, a chuck body having two sets of jaws, two independently movable cam members for actuating the jaws, an actuator for shifting the cam members, and equalizing means between the actuator and the cam members, the actuator and one of the cam members having cooperating shoulders and the two cam members having cooperating shoulders, whereby upon the retraction of the actuator both cam members are retracted.

7. In a chuck, a chuck body having two sets of jaws, two independently movable cam members for actuating the jaws, an actuator for shifting the cam members, and equalizing means between the actuator and the cam members, one of the cam members having a shoulder in the rear of a portion of the actuator and said same cam member having a shoulder in advance of a portion of the other cam member whereby upon the retraction of the actuator it engages the first shoulder and positively retracts the cam member having said shoulder and the second shoulder engages the other cam member and causes its positive retraction.

In testimony whereof, I hereunto affix my signature.

THOMAS J. HUDSON.